Dec. 3, 1929. L. W. HULVA ET AL 1,737,848
STORAGE BATTERY LIQUID LEAK DETECTOR AND FILLER
Filed June 10, 1927
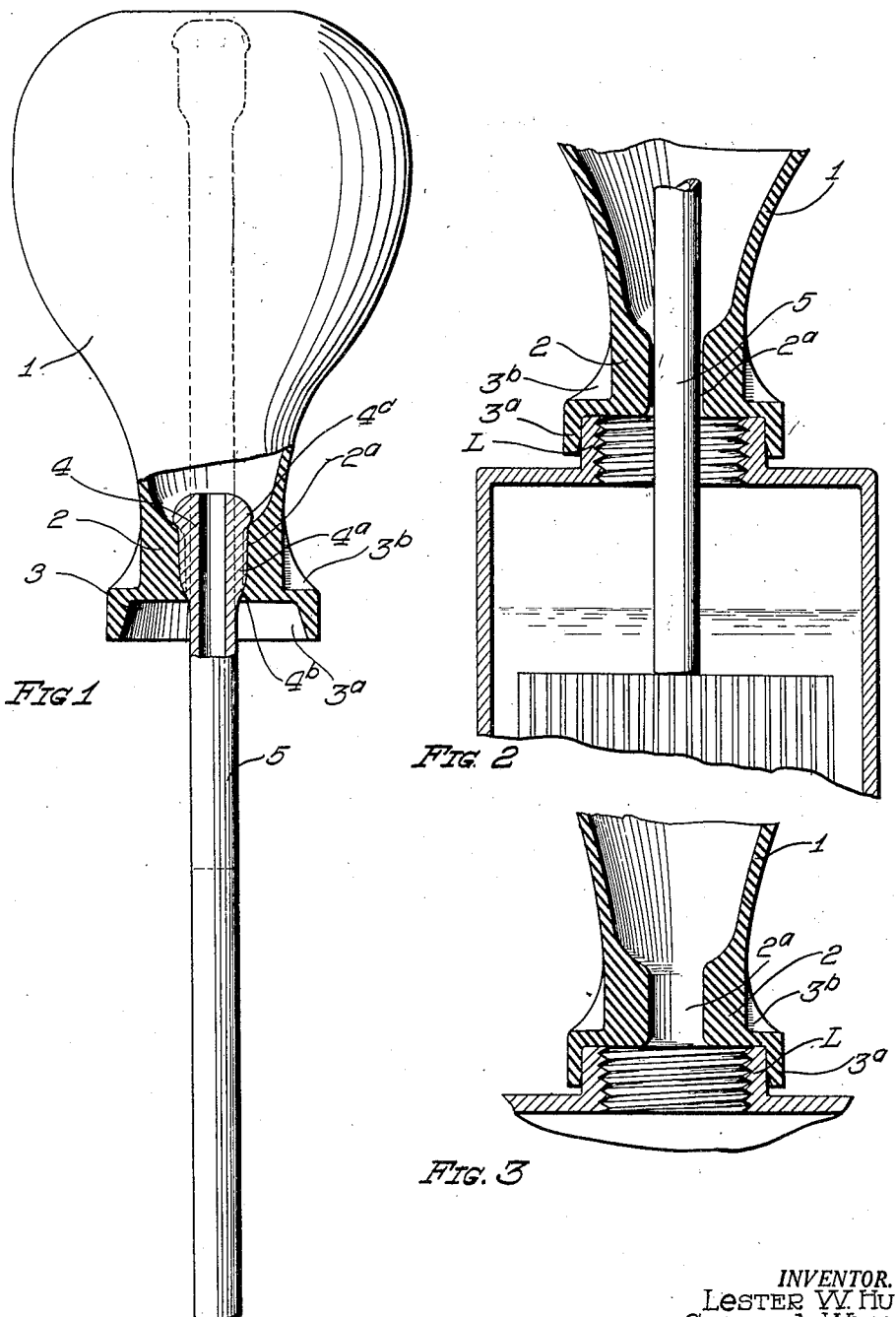
INVENTOR.
LESTER W. HULVA
GEORGE A. WILLIAMS
BY
A.B.C.Bowman
ATTORNEY Patented Dec. 3, 1929

1,737,848

UNITED STATES PATENT OFFICE

LESTER W. HULVA AND GEORGE A. WILLIAMS, OF SAN DIEGO, CALIFORNIA; SAID HULVA ASSIGNOR TO SAID WILLIAMS

STORAGE-BATTERY LIQUID-LEAK DETECTOR AND FILLER

Application filed June 10, 1927. Serial No. 197,988.

Our invention relates to a combination storage battery liquid leak detector and filler, and the objects of our invention are: first, to provide a device for quickly and easily determining any leaks in and around the cells of a storage battery; second, to provide a device of this class which may be used as a combination filler and leak detector; third, to provide a device of this class which is readily applicable to the various makes of batteries now in use; fourth, to provide a device of this class which is readily applied to the battery cell; fifth, to provide a device of this class which may be used separately or in combination with a battery filler; sixth, to provide a novel battery leak detector; and seventh, to provide a device of this class which is very simple and economical of construction, durable, efficient, easy to operate, and which will not readily deteriorate or get out of order.

With these and other objects in view, as will appear hereinafter, our invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of the device, showing the same in combination relation for both leak detector and battery filler, showing some of the portions broken away and in section to facilitate the illustration, and showing by solid lines the position of the filler member when used for battery filling purposes and by dotted lines its position when the device is used for leak detecting; Fig. 2 is a fragmentary sectional view, showing the device in connection with the cell of a battery, showing the filler member of the apparatus pressed back out of the way when used for leak detecting; and Fig. 3 is a sectional view of a fragmentary portion of the device, with the filler member removed, and showing the device for detecting alone and not in combination, shown positioned on the filler opening lug L of a battery cell.

Similar characters of reference refer to similar parts and portions throughout the several views of the drawings.

The bulb member 1, constricted neck portion 2, battery opening lug engaging portion 3, filler tube head 4, and filler tube main portion 5, constitute the principal parts and portions of our storage battery liquid leak detector and filler.

The bulb 1 is a hollow soft rubber member, shaped as shown best in Fig. 1 of the drawings, and is similar in shape to the conventional battery filler bulb. The constricted neck portion 2, however, is provided with an enlarged opening $2^a$, which is a little larger than the diameter of the main portion of the filler tube 5, so that when the filler tube is pushed up into the bulb 1, as shown by dotted lines in Fig. 1 of the drawings, the air will readily pass around the tube through the opening $2^a$. Secured on the lower end of the constricted portion 2 is a flanged recessed portion 3, which is tapered at $3^a$ so that it may be pressed upon the ordinary or conventional filler opening lug of the battery and fit tightly thereon, as shown best in Figs. 2 and 3 of the drawings. It will be noted that this lug portion $3^a$ is reinforced by the heavy material $3^b$ for supporting the extending portion of said member 3. The tube 5 is preferably a hard rubber tube a little smaller in diameter than the opening $2^a$ at its main portion and provided with a head 4 on its one end. This head consists of an enlarged portion $4^a$ with a gradually curved portion $4^b$ extending to the main outer portion of the portion 5. Then upon the extreme end is an enlarged head portion $4^c$, which prevents the tube from coming out. However, by sufficient pressure the portion $4^c$ may be removed outwardly through the constricted opening $2^a$ if it is desired to remove the filler tube portion for any purpose, it being noted that the restricted portion 2 is sufficiently resilient, elastic and flexible to permit the head portion to be forced outwardly if sufficient pressure is brought to bear upon the same.

The operation of the device is as follows:

When it is desired to use the device as a filler, when the combination device is used, as shown in Figs. 1 and 2 of the drawings, the tube member 5 is drawn downwardly in the position shown by solid lines in Fig. 1 of the drawings. Then the device may be used in the ordinary manner for drawing water from any water receptacle up into the bulb portion 1 and then, by depressing the bulb, the water is forced into the battery cell as desired. In case it is desired to use the device as a battery leak detector, the tube 5 is pressed back into the bulb, as shown by dotted lines in Fig. 1 of the drawings and by solid lines in Fig. 2, whereupon the member 3 is forced over the lug L of the battery cell; then by depressing the bulb 1, the air is forced down into the battery cell around the portion 5 at the restricted opening $2^a$, and liquid and air will be forced out through any small opening, hole or crevice in the battery cell and will be readily seen by anyone observing the same at the time the bulb is depressed.

It will be readily seen that if the device is used as a filler and it is desired to test the battery for leaks, it may be quickly and readily done by simply pressing the tube member 5 back into the bulb, as shown by dotted lines in Fig. 1 of the drawings. Then it may be again quickly prepared for use for the other purpose of filling. However, it is obvious that a detector may be constructed the same except that the filler tube, consisting of the members 4 and 5, may be removed by withdrawing it through the opening $2^a$ by using sufficient pressure, and the device or bulb may be used for detecting a leak in the battery cell, as shown by the construction shown in Fig. 3 of the drawings.

Though we have shown and described a particular construction, combination and arrangement of parts and portions and a certain modification thereof, we do not wish to be limited to this particular construction, combination and arrangement nor to the modification, but desire to include in the scope of our invention, the construction, combination and arrangement substantially as set forth in the appended claims.

Having thus described our invention, what we claim as new and desire to secure by Letters Patent is:

1. In a device of the class described, a bulb member provided with a constricted relatively thick wall throat portion near one end, an enlarged tapered recess mouth portion surrounding said constricted portion adapted to fit snugly the lug around the filler opening of a battery cell, a tubular member with a head portion adapted to fit tightly in the thick wall constricted portion of said bulb, and a main portion adapted to freely reciprocate in said constricted portion when said head portion is moved into the bulb from said constricted portion.

2. In a device of the class described, a bulb member provided with a resilient relatively thick wall constricted portion at its open end and also provided with an enlarged tapered recessed portion adapted to fit tightly over the lug around the filler opening of a battery cell, and a tubular member mounted in said constricted opening portion, of smaller diameter than the open portion thereof and provided with an enlarged head end adapted to fit snugly and tightly in said thick wall constricted opening portion.

3. In a device of the class described, a bulb member provided with a resilient relatively thick wall, a constricted portion at its open end and also provided with an enlarged tapered recessed portion adapted to fit tightly over the lug around the filler opening of a battery cell and a tubular member mounted in said constricted thick wall open portion of smaller diameter than the open portion thereof and provided with an enlarged neck portion adapted to fit snugly and tightly in said thick wall portion and provided on its extreme inner end with another enlarged head portion adapted to engage the inner side of the thick wall portion to prevent the easy removal of said tubular member from said thick wall constricted portion.

In testimony whereof, we have hereunto set our hands at San Diego, California, this 1st day of June, 1927.

LESTER W. HULVA.
GEORGE A. WILLIAMS.